United States Patent
Har et al.

(10) Patent No.: US 7,555,050 B2
(45) Date of Patent: Jun. 30, 2009

(54) SPACE-TIME BLOCK CODING SYSTEM COMBINED WITH LOCAL POLYNOMIAL APPROXIMATION BASED BEAMFORMER

(75) Inventors: Dong-Soo Har, Gwangju (KR); Sun-Hee Hwang, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 568 days.

(21) Appl. No.: 11/397,133

(22) Filed: Apr. 3, 2006

(65) Prior Publication Data
US 2006/0256886 A1 Nov. 16, 2006

(30) Foreign Application Priority Data
May 12, 2005 (KR) .................. 10-2005-0039643

(51) Int. Cl.
*H04K 1/10* (2006.01)
*H04L 27/28* (2006.01)
(52) U.S. Cl. .................. 375/260; 375/267; 375/347

(58) Field of Classification Search .................. 375/260, 375/267, 347
See application file for complete search history.

(56) References Cited

U.S. PATENT DOCUMENTS
2004/0213187 A1* 10/2004 Fujii .................. 370/335
* cited by examiner

*Primary Examiner*—Curtis B Odom
(74) *Attorney, Agent, or Firm*—Fenwick & West LLP (57) ABSTRACT

Provided is an STBC transceiving system with LPA-based beamformer, including: an STBC encoder having branches, in number of D, to generate output signals in number of D for an input signal; a beamformer having output antennas in number of D*B, being comprised of beam-forming subarrays in number of D each having the output antennas in number of B to form a downlink beam from the D-numbered output signals of the STBC encoder; and an STBC decoder restoring an original signal by dividing a signal, which is received as one with signals transmitted through a mobile antenna from the D-numbered beam-forming subarrays, into signals in number of D in accordance with the subarrays in consideration of channel characteristics.

5 Claims, 10 Drawing Sheets

SPACE-TIME BLOCK CODING SYSTEM COMBINED WITH LOCAL POLYNOMIAL APPROXIMATION BASED BEAMFORMER

CROSS-REFERENCE TO RELATED APPLICATION

This application claims priority under 35 U.S.C. §119(a) from Republic of Korea Patent Application No. 10-2005-0039643, filed on May 12, 2005, which is herein incorporated by reference.

BACKGROUND OF THE INVENTION

1. Field of the Invention

The present invention relates to STBC (Space-Time Block Coding) transceiving systems combined with LPA (Local Polynomial Approximation)-based beamformer. In particular, the present invention relates to a STBC (Space-Time Block Coding) transceiving system associated with an LPA (Local Polynomial Approximation)-based beamformer, enabling high-speed data transmission by raising a restoration rate and lowering a bit-error rate for a wireless communication signal including many noises by way of forming downlink beams toward a mobile user using multiple array antenna disposed at a base station.

2. Description of the Related Art

Nowadays, while there are increasing demands for advanced wireless communication services, and requirements for higher transmission rates, system performance, and operational efficiencies, it is still not possible to assure high-quality service for users due to various disturbances such as noise, channel fading effects, interference signals, and so forth. Those properties of the wireless communication environment do not ensure that received signal is fully restored over noise signal, so it causes high bit-error rates (BER) for transmission signals. Therefore, it is increasingly necessary to implement wireless communication systems capable of lessening BER by overcoming such inherent properties extant in the wireless environments although noise becomes stronger in proportion to the intensity of signals.

On the other hand, for the purpose of producing high-performance wireless communication systems, there have been various ways proposed to achieve this such as utilizing power control, channel-coding, frequency division, or code division, and employing divided cells or diversity antennas, while there is now interest in smart antennas on downlink.

The smart antenna is configured to form a downlink beam pattern adaptive only to a single mobile user, instead of forming a downlink beam pattern emitting all around from plural array antenna disposed at a base station. This is advantageous as it decreases the interference effect to pluralities of mobile users in a cell and raises the gain of a received signal for the single mobile user.

Meanwhile, if a mobile user is moving, the DOA (direction of arrival) of a signal from the mobile user varies with time. Thus, considering such inherencies of wireless communication environments, there is nothing more important than estimating the DOA of a signal and movement of a user while forming a downlink beam.

However, conventional antenna systems do not consider movements of users, only the current locations of the users. Conventional beam-forming devices operate only considering DOA of a signal from mobile users without information about users' movements. Thus, it is difficult to offer high quality data transmission to moving mobile users. Therefore, the conventional beam-forming systems display good results in estimating DOA of fixed signals, but are unsatisfactory at estimating the movement of mobile users.

Furthermore, studies are still needed to continue improving the system complexity related to calculation amounts and accuracy in estimating movements of mobile users by the beam-forming systems.

SUMMARY OF THE INVENTION

The present invention is directed at solving the aforementioned problems arising from the conventional wireless communication system, providing a high-performance communication system which is able to conduct high data transmission rates by reducing a probability of re-transmission on the same channel, lowering bit-error rates (BER) by increasing the accuracy of signal restoration, even with a wireless communication channel having a high noise to signal ratio. The invention is especially directed to an STBC transceiving system combined with an LPA-based beamformer that is able to overcome the inherent weakness of wireless communication environments, utilizing all the merits of each system such as transmission diversity benefits of an STBC system and high gain of received signal of an LPA system.

An aspect of the present invention is to provide a space-time block coding (STBC) transceiving system combined with beamformer based on local polynomial approximation (LPA), being comprised of: an STBC encoder having branches in number of D to generate output signals in number of D for a single input signal; a beamformer having output antennas in number of D*B, which includes beam-forming subarrays in number of D each having the output antennas in number of B to form downlink beams from signals in number of D outputted from the STBC encoder; and an STBC decoder restoring an original signal by dividing a single signal, which is transmitted from the D-numbered beam-forming subarrays to a single mobile antenna, into signals in number of D in consideration of channel characteristics.

BRIEF DESCRIPTION OF THE DRAWINGS

The accompanying figures are included to provide a further understanding of the invention, and are incorporated in and constitute a part of this specification. The drawings illustrate example embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as to be limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, an exemplary embodiment of the present invention will be described in conjunction with the accompanying drawings.

Figure 1:
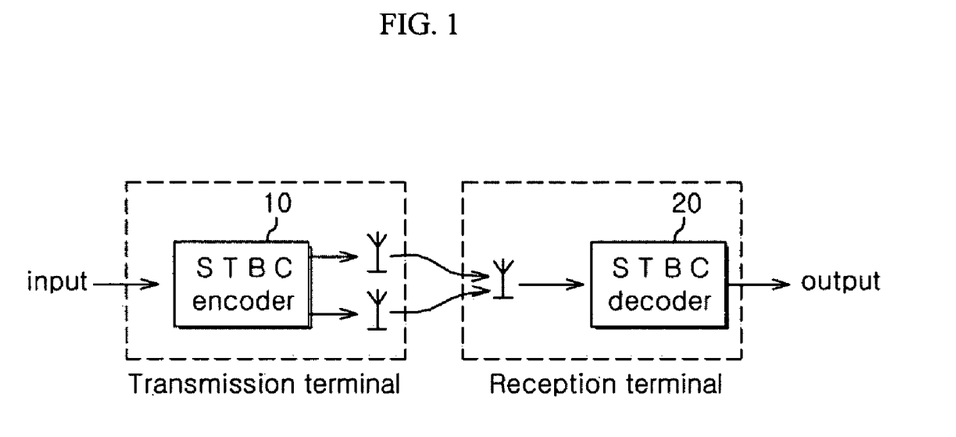
FIG. 1 is a schematic showing a signal transceiving system with two branches in a STBC mode.

FIG. 1 is a schematic showing a signal transceiving system with two branches in the STBC mode.

As illustrated in FIG. 1, an STBC encoder 10 having two branches generates two output signals from an input signal by way of the two branches. The output signals are transferred to a mobile user through a downlink channel disposed between a base station and the mobile user.

During the transfer, the output signals are accompanied by channel properties such as noises, fading, and interference signal components. The two signals with the channel properties are received by a single antenna of a mobile receiving terminal, becoming an input signal of the STBC decoder 20. The input signal is restored through the STBC decoder 20.

An encoding conversion matrix for the STBC encoder 10 with the two branches is summarized in the following Equation 1.

$$G_2 = \begin{pmatrix} s_0 & s_1 \\ -s_1^* & -s_0^* \end{pmatrix} \quad \text{[Equation 1]}$$

Assuming that the number of branches used in the STBC encoder 10 is D, the conversion matrix is generated when D=2. If there is a signal input within a given symbol period, two rows of the conversion matrix each represent branches while two columns each represent signals input in the given and next symbol periods. Assuming that a signal input within the given period is s and output signals of the first and second branches are each so and $s_1$, an output signal of the first branch in the next symbol period, according to the conversion matrix shown in Equation 1, is generated by way of symbolizing and complex-operating the output signal $s_1$ of the second branch of the previous symbol period, and an output signal of the second branch is generated by way of complex-operating the output signal so of the first branch of the previous symbol period.

When the number of branches is set at 4, an input-signal conversion matrix is arranged as follows.

$$G_4 = \begin{pmatrix} s_0 & s_1 & s_2 & s_3 \\ -s_1 & s_0 & -s_3 & s_2 \\ -s_2 & s_3 & s_0 & -s_1 \\ -s_3 & -s_2 & s_1 & s_0 \\ s_0^* & s_1^* & s_2^* & s_3^* \\ -s_1^* & s_0^* & -s_3^* & s_2^* \\ -s_2^* & s_3^* & s_0^* & -s_1^* \\ -s_3^* & -s_2^* & s_1^* & s_0^* \end{pmatrix} \quad \text{[Equation 2]}$$

The conversion matrix shown in Equation 2 is extended from the matrix formed by the condition of D=2, corresponding to the case of D=4. As in the conversion matrix shown in Equation 1, rows of the conversion matrix shown in Equation 2 represent branches while columns thereof represents input signals according to given symbol periods.

As the conversion matrix of D=4 requires 8 symbol periods for a single input signal, it is constructed of 4 rows and 8 columns.

Figure 2:
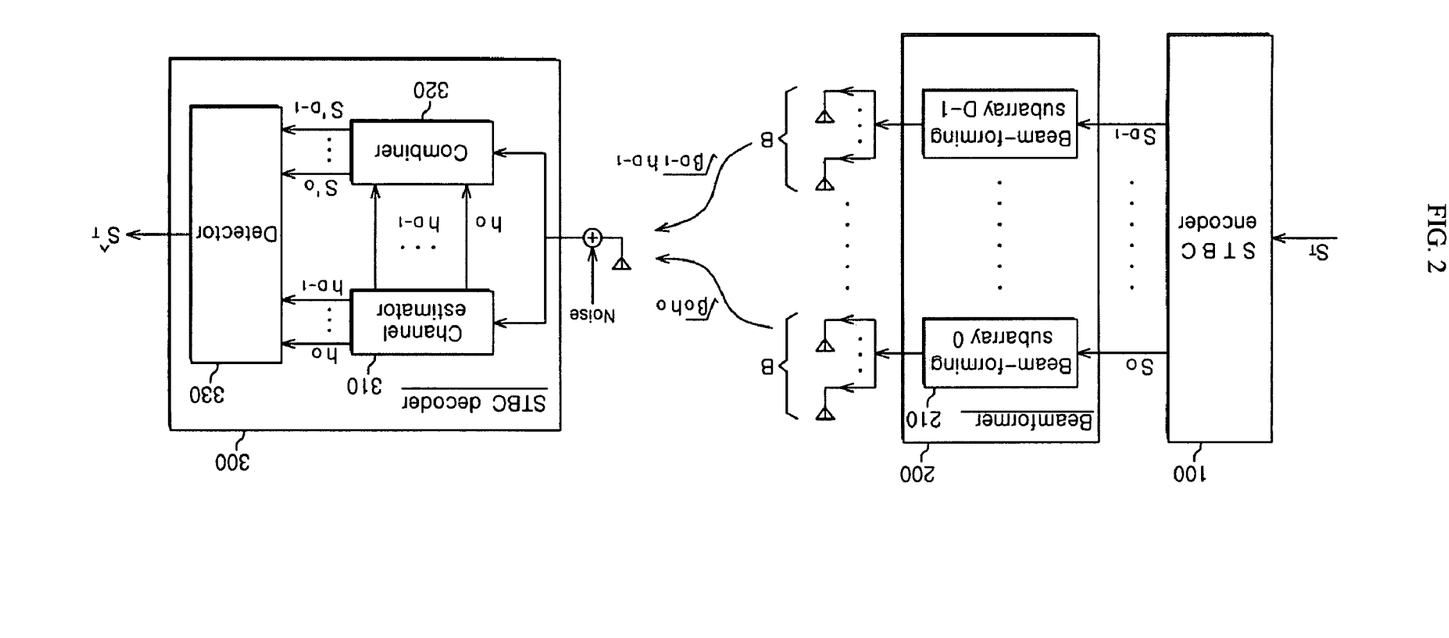
FIG. 2 is a schematic illustrating a signal transceiving system in accordance with the present invention.
Figure 3:
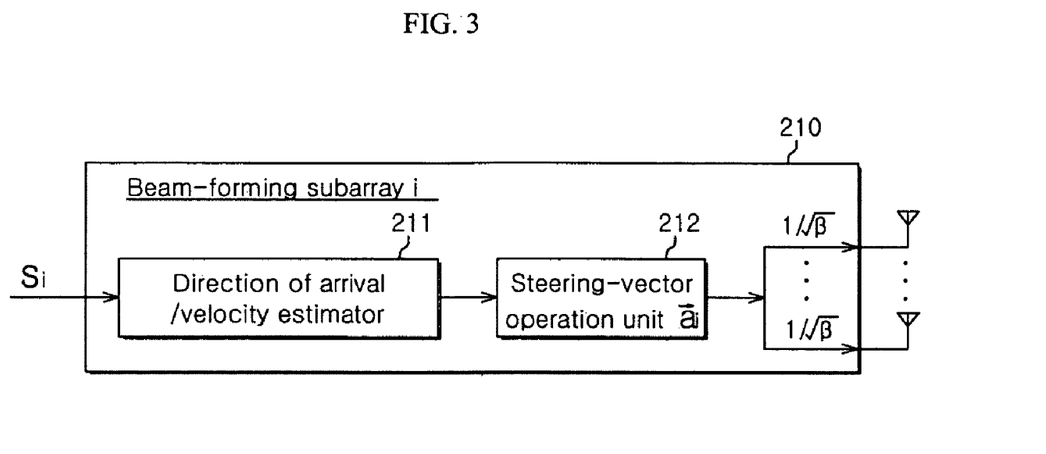
FIG. 3 is a schematic illustrating a beam-forming subarray shown in FIG. 2.

FIG. 2 is a schematic illustrating a signal transceiving system in accordance with the present invention, and FIG. 3 is a schematic illustrating a beam-forming subarray shown in FIG. 2.

As shown in FIG. 2, the system of the present invention is configured by combining beam-forming subarrays, to the STBC transceiving system shown in FIG. 1. In other words, the system shown in FIG. 2 is organized by combining an LPA-based beamformer, which has output antennas in number of D*B, to an STBC organization extended to D branches.

A system transmission terminal of the present invention is comprised of an STBC encoder 100 and a beamformer 200, while a reception terminal is composed of an STBC decoder 300.

For simplicity of notation herein, the extended system may be represented just by a matrix (D,B) with the number of branches D of the STBC encoder 100, and output antennas B of the beam-forming subarrays 210.

The beamformer 200 is composed by combining beam-forming subarrays 210 in number of D, generating a downlink beam through each output of the subarrays 210 from a signal by the STBC encoder 100.

Each of the beam-forming subarrays 210, as shown in FIG. 3, is comprised of a direction of arrival/velocity estimator 211 and a steering-vector operation unit 212 for an array antenna in number of B.

Each antenna output of the beam-forming subarrays 210 is standardized into $1/\sqrt{\beta}$. Here, the parameter $\beta$ is a shadow fading component or path loss for all signals between each subarray and a reception antenna, which is assumed as being same for all signals.

$$\vec{a}(\theta) = \quad \text{[Equation 3]}$$
$$\frac{1}{\sqrt{B}}\left(\exp j\frac{2\pi}{\lambda}d_1\sin\theta, \exp j\frac{2\pi}{\lambda}d_2\sin\theta, \ldots, \exp j\frac{2\pi}{\lambda}d_B\sin\theta\right)$$

Equation 3 describes a steering vector for the array antenna in number of B used in the beam-forming subarrays 210. The steering vector is evaluated by using the wavelength and DOA of signals so as to adjust a delay component according to distance d between antennas on the basis of a position of a first antenna, which is generally utilized as a weight value of the antenna, $\lambda$ in Equation 3 is the wavelength of the signal received at each of the B-numbered antennas.

$$\theta(t+u) = \theta(t) + \theta'(t)u + \frac{\theta''(t+\xi u)}{2}u^2 + \ldots \quad \text{[Equation 4]}$$
$$= c_0 + c_1 u$$
$$c_0 = \theta(t), c_1$$
$$= \theta'(t)$$

Equation 4 represents notations for Tailor series and substitution variables of DOA with delay components.

Here, $\theta(t)$ denotes DOA of a user signal at a time t and $\theta(t+u)$ denotes DOA of the user signal when there is a delay by time u.

Considering a mobile user who is moving, a DOA $\theta$ of a current mobile user's signal may contain a delay component u to the previous DOA. In the Tailor series notation for the DOA of a signal containing the delay component u, it disregards a result beyond the second differential term because the value is negligible. The DOA θ(t) and the first differential measurement θ(t) are used as velocity variables and then the variables are replaced with $c_0$ and $c_1$.

$$C = (c_0, c_1)^T \quad \text{[Equation 5]}$$

Equation 5 is a variable matrix that arranges the DOA and velocity variable of signals, represented by the two variables $c_0$ and $c_1$, into a single vector. Hereinafter, the vector notation will be utilized in the following operations.

$$w(t) = 1, 0 \leq t \leq 1 \quad \text{[Equation 6]}$$

Equation 6 is a modified window function used to describe infinitely continuous signals from a mobile user as definite and discrete samples. That is, the modified window function is provided to represent continuous signal samples in the discrete form, which means it uses samples present in a time t with reference to a current sample among the continuous signal samples.

$$F(c, s(t), t) = \sum_{u=1}^{50} w(u) \sum_{k=1}^{B} |r_k(t+u) - \vec{a}(C, u)s(t+u)|^2 \quad \text{[Equation 7]}$$

Equation 7 is a function for estimating DOA and velocity of a user with reference to differences between original and estimated signals for all samples in the modified window. Equation 7 is provided to obtain a total sum of absolute squares from the differences of the restored signals s(t), in consideration of antenna characteristics, to original signals r(t), each for samples within the modified window period. A smaller total sum denotes the system is improving in performance. The small value of the total sum represents small differences between original and restored signals, connoting that the system is able to estimate DOAs most near to those of the original signals.

Therefore, it can be seen that the variable matrix C denoting the minimum value of the estimating function shows DOAs and mobile user's velocities which are used to form downlink beams.

In Equation 7, the parameter u is valued from 1 to 50, which means it partially utilizes 50 samples with reference to a current sample. The parameter k represents an index designating the k'th antenna of each subarray. The item $r_k(t+u)$ denotes a signal transmitting to a base station from a mobile user. It represents one of the 50 discrete samples obtained by the modified window function, from the k'th continuous signal transmitted by each antenna. The item s(t+u) represents a mobile user's signal estimated at the base station, which results in $\bar{a}(C,u)s(t+u)$ by combining the steering vector with passing through the plural antennas of the base station.

In other words, it obtains a differential value between the signal $r_k(t+u)$, which is currently received at the base station, and the signal $\bar{a}(C,u)s(t+u)$ estimated therefrom, for the k'th signal periodically segmented into the 50 samples, and then squares the differential value to get a difference between the actual and estimated signals.

Equation 7 evaluates the matrix C that shows the variables of DOA and velocity in the steering vector when the difference between actual and estimated signals corresponds to the smallest value, and thereby the DOA and velocity for finding the accurate location of a user.

Meanwhile, as Equation 7 has a complicated procedure and involves a large amount of calculation, it is preferable to use another form, obtained by differentiating Equation 7, represented by the following Equation 8.

$$f(C, t) = \sum_{u=1}^{50} w(u) \sum_{k=1}^{B} |\vec{a}(C, u)r_k(t+u)|^2 \quad \text{[Equation 8]}$$

Equation 8 is an LPA-based beam-forming equation derived from the first differential equation of the signal-estimating function. As aforementioned, Equation 8 is provided to simplify the arithmetic procedure for obtaining the variable matrix C from the estimating function, resulting in the smallest value of signal estimation when this value reaches the maximum.

In summary, Equation 7 is processed in the differential operation with an estimated signal in order to lessen the complexity in obtaining the variables about DOA and velocity of a mobile user. From the differential operation, Equation 8 is obtained. As Equation 7 generates the minimum value thereof, in correspondence with the maximum value of Equation 8, according to the maximum value theory, a value of the variable matrix C in this case represents the DOA and instantaneous velocity of a mobile user.

$$f(\theta, t) = \frac{1}{B} \vec{a}(\theta) R(t, w) \vec{a}^H(\theta) \quad \text{[Equation 9]}$$

Equation 9 is a beam-forming term, generating the same value as the result of Equation 8 in which the velocity $c_1$ of a mobile user is 0. Assuming that the velocity of a mobile user is 0, the variable C, representing the DOA and velocity of the mobile user, may be summarized into $\theta_{DOA}$, but is simply shown as θ for convenience of notation.

In this case, Equation 8 may be summarized as follows, by means of using only the DOA θ.

$$f(\theta, t) = \sum_{u=1}^{50} w(u) \frac{\vec{a} r(t+u) r^H(t+u) \vec{a}^{H(\theta)}}{B}$$

Therefore, it can be understood that a general beam-forming system has low performance in estimating a velocity of a mobile user who is moving, because it is only able to estimate DOA for a fixed signal.

$$R = \sum_u w(u) r(t+u) r^H(t+u) \quad \text{[Equation 10]}$$

Equation 10 is a signal-relative equation used in a conventional beam-former (CBF), which shows similarities between two signals. When the result of Equation 10 generates a large value, it means high similarities between the two signals. Here, it is used as a reference to determine the similarities between the two signals, i.e., a restored signal and an original signal without movement.

Next, the STBC decoder 300 is comprised of a channel estimator 310, a combiner 320, and a detector 330.

The channel estimator 310 is provided to enable channel estimation even in a mobile reception terminal. It may be assumed the channel characteristic is like a communication channel because the channel characteristic h between each subarray 210 and the mobile reception antenna is represented by modeling it into complex Gaussian random variables with an average of 0 and variance of 1.

When signals transmitted from the plural subarrays 210 are received by a singe mobile antenna and mixed into one signal, the combiner 320 separates the received signal into signals, according to the subarrays 210, in consideration of the channel characteristics.

For example, in the case of using two subarrays, the signal unit received by a mobile user's antenna is divided into two signals, which are transmitted from the two subarrays as the originals, by the combiner 320. A signal-modeling operation carried out by the combiner 320 will be described with the following Equations 13 and 14.

The detector 330 restores the signals in the STBC decoder 300, considering the channel characteristics and the steering vector of the antenna, different from a general scheme of deciding restored signal values. The procedure of signal restoration by the detector 330 is described with reference to Equations 15 through 18. With the STBC decoder 300, a single signal accepted by the mobile antenna is combined with the channel characteristics, $h_0 \sim h_{D-1}$, which are assumed as being set by the channel estimator 310, in the combiner 320. And, after dividing the combined signal into $s'_0 \sim s'_{D-1}$ by means of the algorithm of the combiner 320, the detector 330 restores the original signal $\hat{S}_T$.

$$r_0(t)=s_0 h_{a0}(t)+s_1 h_{a1}(t)+n_0(t) \quad r_1(t)=-s_1^*(t)h_{a0}(t)+s_0^*(t)h_{a1}(t)+n_1(t)$$ [Equation 11]

Equation 11 shows a received signal toward a mobile user, which is divided by the output antennas of each branch in the case of using two branches. In other words, Equation 11 represents the signal r(t), by the transmission antenna, which is received at a reception terminal of the mobile user comprising a single antenna. Thus, a signal accepted by the reception terminal of a mobile user is identical to the total sum of the received signals arriving from each transmission antenna.

Figure 4:
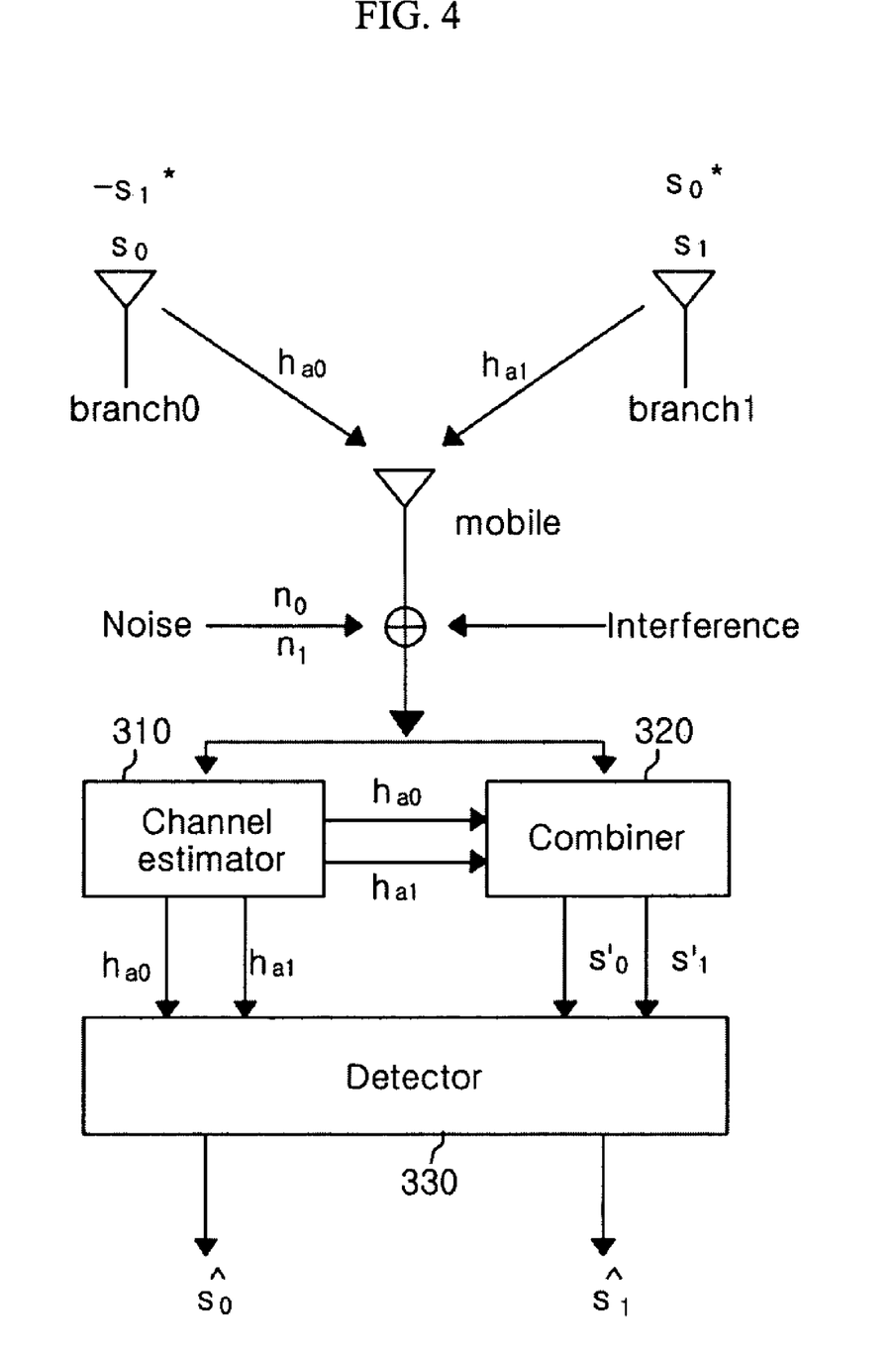
FIG. 4 is a diagram illustrating a transmission flow in an STBC encoder.

FIG. 4 is a diagram illustrating a transmission flow in the STBC encoder (100).

As shown in FIG. 4, the signals, $s_0(t)$ and $-s_1^*(t)$, transmitted by the the first branch and subarray pass through the channel $h_{a0}(t)$. The signals, $s_1(t)$ and $s_0^*(t)$, transmitted by the second branch and subarray, pass through the channel $h_{a1}(t)$. During this, the signals passing through each of the channels are combined with the noise components $n_0(t)$ and $n_1(t)$, respectively. These signal-processing features are summarized in Equation 11 in the divisional forms of signals passing through each symbol period.

In Equation 11, $r_0(t)$ denotes a signal received at a reception terminal, being combined with channel noise after each branch and subarray, during a first symbol period, while $r_1(t)$ denotes a signal received at the reception terminal during the next symbol period. Namely, $r_1(t)$ may be rewritten as follows, using the signals $-s_1^*(t)$ and $s_0^*(t)$, those are transmitted in the next symbol periods of $s_0(t)$ and $s_1(t)$, as the second line of Equation 11.

$$r_1(t)=r_0(t+T)=-s_1^*(t)h_{a0}(t)+s_0^*(t)h_{a1}(t)+n_1(t)$$

Therefore, Equation 11 may result from channel characteristics, noises, and steering vector operations for transmission antennas of the beam-forming subarrays 210, while encoded signals treated by the STBC encoder 100 are passing through the beamformer 200.

$$h_{a0}(t)=a_0(\theta_{DOA})h_0(t) \quad h_{a1}(t)=a_1(\theta DOA)h_1(t)$$ [Equation 12]

Equation 12 arranges the features of channel responses $h_{a0}(t)$ and $h_{a1}(t)$, resulting from combining the channel characteristics and steering vector of antennas. In detail, the plural antennas of the subarray have steering vectors $a_0(\theta_{DOA})$ and $a_1(\theta_{DOA})$ in accordance with DOA $\theta_{DOA}$ of the user's signal. As the plural antennas belonging to each subarray are influenced by channels through which signals pass, new channel responses $h_{a0}(t)$ and $h_{a1}(t)$ are defined as in Equation 12, in which the steering vectors $a_0(\theta_{DOA})$ and $a_1(\theta_{DOA})$ of the subarray are associated with channel responses $h_0(t)$ and $h_1(t)$.

$$s'_0(t) = \vec{h}_{a0}^* \vec{r}_0(t) + \vec{h}_{a1} \vec{r}_1^*(t)$$

$$s'_1(t) = \vec{h}_{a1}^* \vec{r}_0(t) + \vec{h}_{a0} \vec{r}_1^*(t)$$ [Equation 13]

Equation 13 shows the procedure of combining signals, which are received by a single antenna, into two branch signals in the combiner 320 of the STBC decoder 300 under the assumption that channel characteristics are completely known through the channel estimator 310 of the STBC decoder 300.

$$s'_0(t) = (a_0^2 a_0^2 + a_1^2 a_1^2)s_0(t) + \vec{h}_{a0} * \vec{n}_0(t) + \vec{h}_{a1} \vec{n}_1 * (t)$$

$$s'_1(t) = (a_0^2 a_0^2 + a_1^2 a_1^2)s_1(t) + \vec{h}_{a1} * \vec{n}_0(t) + \vec{h}_{a0} \vec{n}_1 * (t)$$ [Equation 14]

Equation 14 is derived by applying Equation 11 to Equation 13. Through the former arithmetic operations, it can be seen that signals accepted by a single antenna of a mobile user are combined into $s'_0(t)$ and $s'_1(t)$, similar to the signals output from the two branches, by the combiner 320.

$$d^2(r_0(t),s_j(t)h_{a0}(t))+d^2(r_1(t),s_j(t)h_{a1}(t)) \leq d^2(r_0(t),s_k(t)h_{a0}(t))+d^2(r_1(t),s_k(t)),\forall j \neq k$$ [Equation 15]

$$d^2(x,y)=(x-y)(x^*-y^*)$$ [Equation 16]

Equation 15 shows how signal restoration in the detector 330 of the STBC decoder 300, regarding channel responses with combination between the channel characteristics and steering vectors, is different from a general way of obtaining restoration signals. This makes one of binary reference bits, 0 and 1, set into the combined signal $s'_0$ or $s'_1$ that are combined in the pattern shown in Equation 14. The signal restoration produced by Equation 15 evaluates a Euclidian distance between received and original signals, to convert a restored signal into a binary signal by substituting the evaluated signal with a value close to a smaller one.

Here, the Euclidian distance, as shown by Equation 16, means an interval between two signals by way of evaluating a dot product of the signals.

The items $s_j(t)$ and $s_k(t)$ represent reference values of the signal to be restored. Since it needs to restore a binary signal, the reference signals $s_j(t)$ and $s_k(t)$ may be represented as 0 and 1, respectively.

The item $r_0(t)$ denotes a signal received at the reception terminal after passing through the first branch and subarray of the STBC encoder 100 that has two branches, while the item $r_1(t)$ denotes a signal arrived at the reception terminal after passing through the second branch and subarray of the STBC encoder 100 that has two branches.

The procedure of signal restoration in the detector 330 of the STBC decoder 300 is carried out by utilizing the Euclidian distances that represent intervals between a reference signal and received signals passing through each of the branches.

The total distance to the reference value $s_j(t)$, for a signal transmitted from the STBC encoder 100 during a symbol period, may be obtained by summing up a Euclidian distance for variation when the reference signal $s_j(t)$ is transmitted on the channel $h_{a0}(t)$ through which the signal $r_0(t)$ passes, to the signal $r_0(t)$ transmitted through the first branch and subarray, with a Euclidian distance for variation when the reference signal $s_j(t)$ is transmitted on the channel $h_{a1}(t)$ through which the signal $r_1(t)$ passes, to the signal $r_1(t)$ transmitted through the second branch and subarray.

In this way, the distances respective to the reference signals are represented as follows, using the same method for the reference signal $s_k(t)$.

$$d^2(r_0(t),s_j(t)h_{a0}(t))+d^2(r_1(t),s_j(t)h_{a1}(t))$$

$$d^2(r_0(t),s_k(t)h_{a0}(t))+d^2(r_1(t),s_k(t)h_{a1}(t))$$

Therefore, it is possible to restore the reference signal values by comparing the distances of the transmission signals to each of the reference signals, as shown in Equation 15. For instance, if a signal distance value to the reference signal $s_j(t)$ is smaller than that to the reference signal $s_k(t)$, the transmission signals $r_0(t)$ and $r_1(t)$ are restored to the reference signal $s_j(t)$.

The following inequality can be established by substituting Equation 14 for Equation 15.

$$(\alpha_0^2 a_0^2+\alpha_1^2 a_1^2-1)|s_j|^2 + d^2(s_0,s_j) \leq (\alpha_0^2 a_0^2+\alpha_1^2 a_1^2-1)|s_k|^2 + d^2(s_0,s_k), \forall j \neq k$$

The items $|s_j|^2$ and $|s_k|^2$, which represent the energy levels of the signals $s_j$ and $s_k$, have the same value. Thus, summarizing the inequality described above utilizing $(\alpha_0^2 a_0^2+\alpha_1^2 a_1^2-1)|s_j|^2=(\alpha_0^2 a_0^2+\alpha_0^2 a_1^2-1)|s_k|^2, \forall j \neq k$, there are only items representing distances to the reference signals 0 and 1. As a result, the following Equation 17 is obtained. If the same mode is applied to the signal $s'_1$, the following Equation 18 is derived therefrom.

$$d^2(s'_0,s_j) \leq d^2(s'_0,s_k), \forall j \neq k \quad \text{[Equation 17]}$$

$$d^2(s'_1,s_j) \leq d^2(s'_1,s_k), \forall j \neq k \quad \text{[Equation 18]}$$

Equation 17 shows the restored values of signals transmitted from the output antennas of the first branch, while Equation 18 shows the restored values of signals transmitted from the output antennas of the second branch. The restored values are in accordance to the scheme of determining the restored signal values in the STBC decoder 300 as shown in Equation 15.

As can be seen from Equations 17 and 18, even in the STBC transceiving system combined with the beamformer 200, the systemic complexity in encoding and decoding procedures is similar to the case of simply using an STBC system without the beamformer. Thus, it is possible to design a system in consideration of only the complexity of estimating a user's movement by way of LPA.

Figure 5:
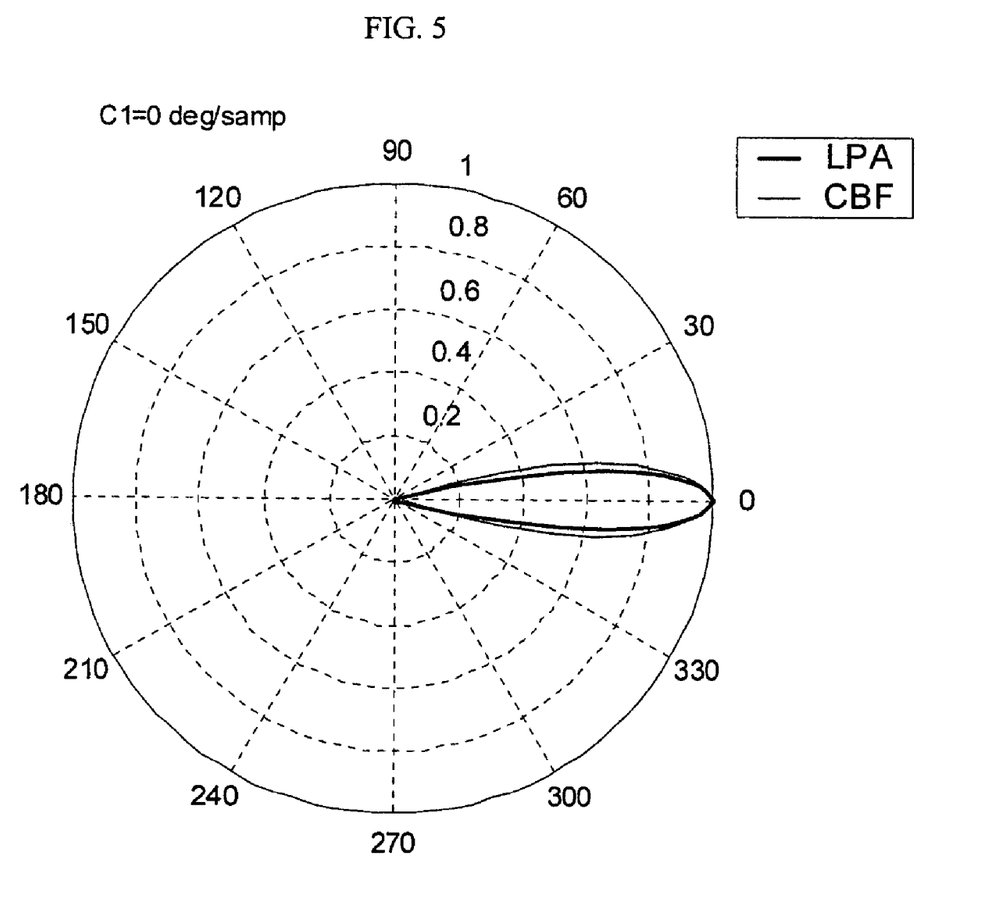
FIG. 5 is a schematic diagram illustrating patterns of tracing downlink beams when a mobile user velocity is set at 0.

Next, FIG. 5 illustrates patterns of tracing downlink beams when a mobile user velocity is set at 0, showing CBF and LPA-based STBC beam-tracing patterns. From FIG. 5, it can be seen that both beam-forming patterns are similar to each other for a signal from a mobile user who is standing without moving.

Figure 6:
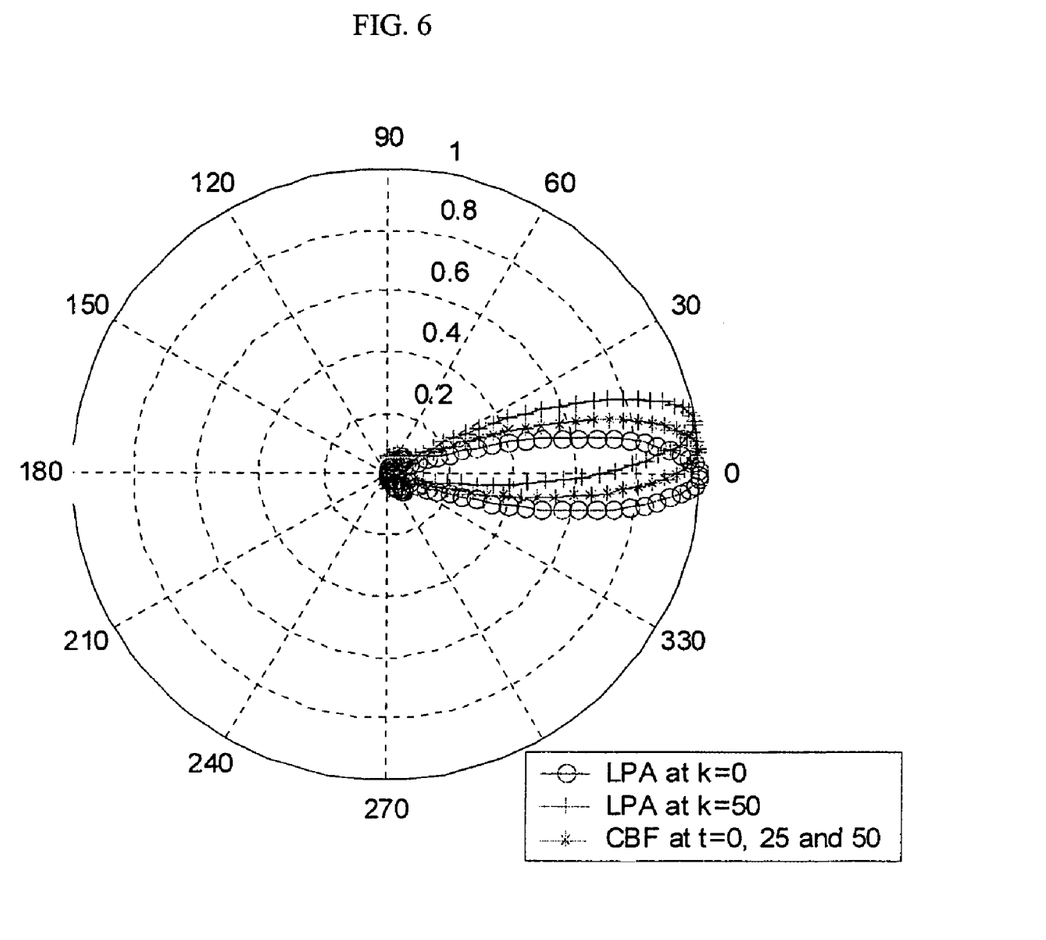
FIG. 6 is a diagram illustrating patterns of tracing downlink beams in CBF/LPA-based STBC modes according to samples when a mobile user velocity is 0.2 deg/samp.

FIG. 6 is a diagram illustrating patterns of tracing downlink beams in CBF/LPA-based STBC mode according to samples when a mobile user velocity is 0.2 deg/samp. From FIG. 6, it can be seen that the LPA-based STBC mode is able to correctly trace a DOA to a mobile user according to the sample k, while the CBF-based one hardly adapts to the DOAs according to the samples. The CBF mode seems to estimate intermediate values among the samples in the modified CBF window.

Figure 7:
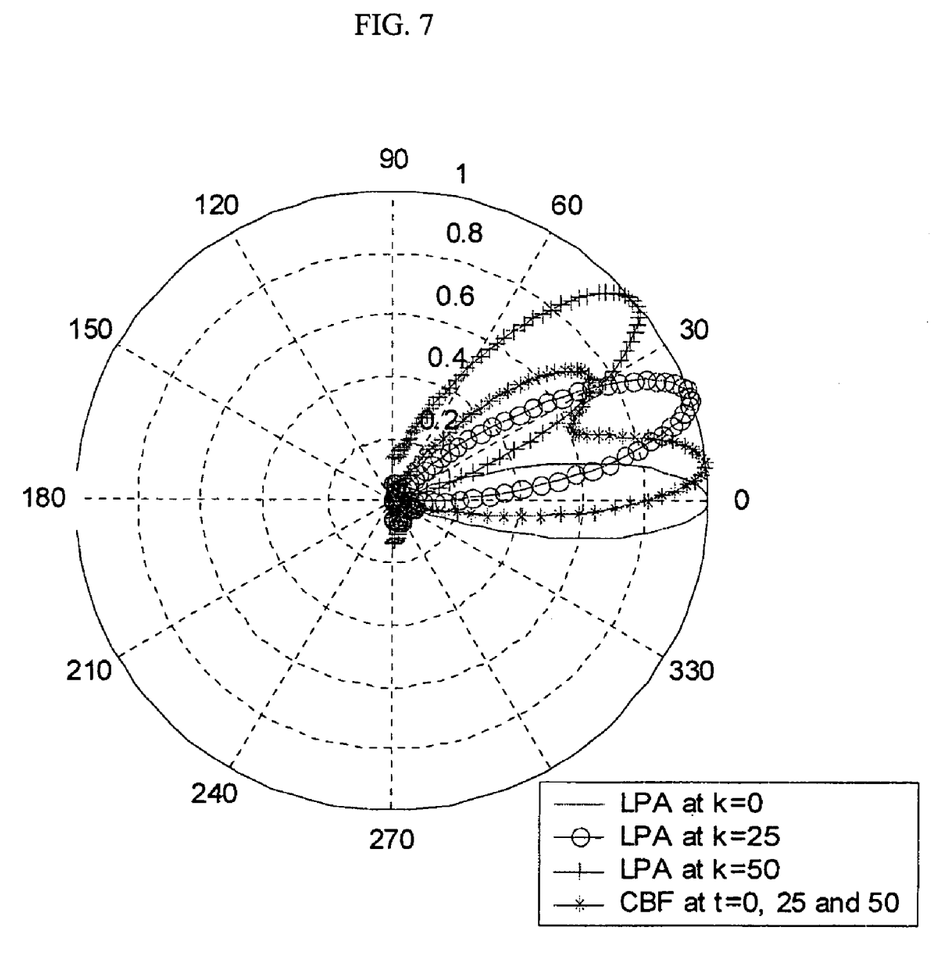
FIG. 7 is a diagram illustrating patterns of tracing downlink beams in CBF and LPA-based STBC modes according to samples when a mobile user velocity is 0.8 deg/samp.

FIG. 7 illustrates patterns of tracing downlink beams in CBF and LPA-based STBC modes according to samples when a mobile user velocity is 0.8 deg/samp. From FIG. 7, the LPA-based STBC mode is correctly estimating DOAs according to the sample k, regardless of the velocity of a mobile user. But, the CBF-based beam-forming pattern is distorted and widened, generating side lobes in addition to a main lobe. As the formation of the side lobes deteriorates the strength of the main lobe, it is apprehensible that received signals within the main lobe will vary in intensity in accordance with the presence/absence and patterns of the side lobes.

Figure 8:
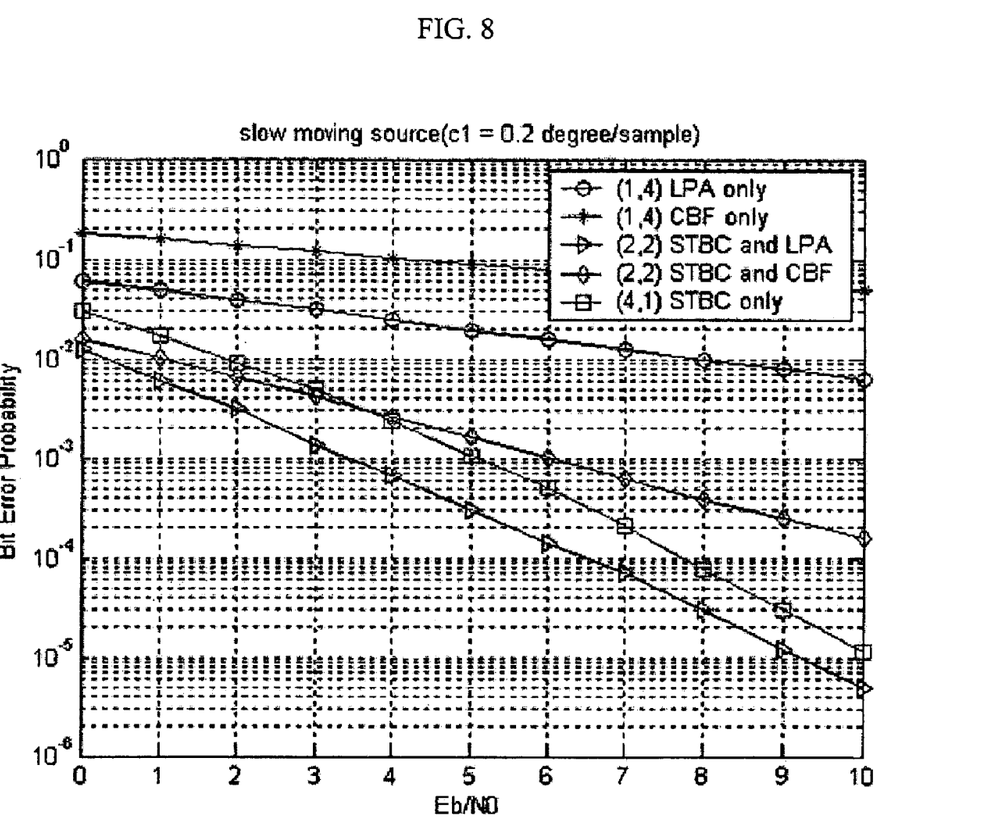
FIG. 8 is a graph depicting bit-error rates of systems when a mobile user velocity is 0.2 deg/samp.
Figure 9:
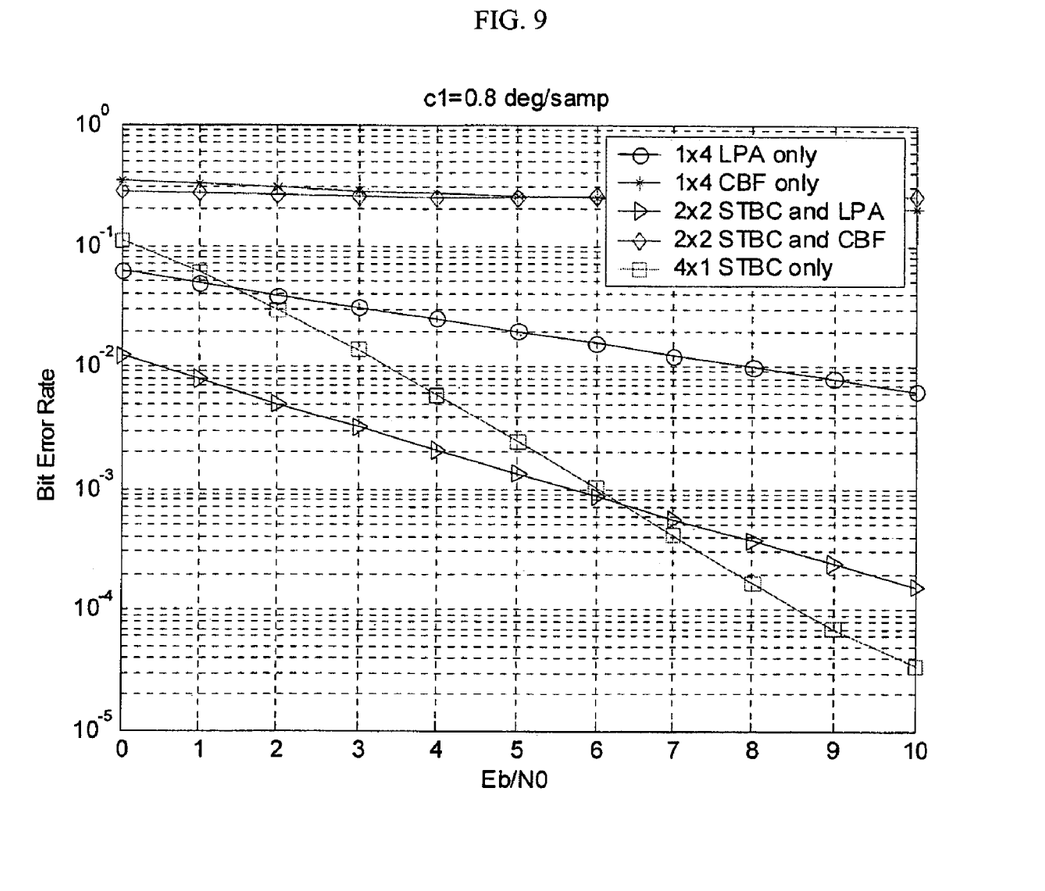
FIG. 9 is a graph depicting bit-error rates of systems when a mobile user velocity is 0.8 deg/samp.

FIGS. 8 and 9 show bit-error rates of systems in accordance with velocities of a mobile user. FIG. 8 depicts bit-error rates of systems when a mobile user velocity is 0.2 deg/samp.

From the results shown in FIG. 8, it can be seen that while the LPA-based STBC system has a lower bit-error rate compared to the CBF-based STBC system, there is little difference between them. By FIG. 8, it is possible to compare several system features using STBC, beam-forming mode, and a combined mode, with each other.

When Eb/No is small, an STBC system based on beamformer has a lower bit-error rate. When Eb/No is increasing, an STBC system with a larger number of multi-array antennas has the best performance among them. These results are the same even in the case that a mobile user's velocity is increasing. It can also be seen that the LPA-based STBC system has the highest performance for the same multi-array antenna.

FIG. 9 depicts bit-error rates of each system when a mobile user velocity is 0.8 deg/samp.

Regarding the features shown by FIG. 9, it can be seen that there is a large difference between the LPA and CBF-based STBC systems in performance. This result arises from a gap of performance between the LPA mode, which assures a constant signal gain by correctly estimating a DOA of a mobile user, and the CBF mode that is disabled to estimate a correct DOA of a mobile user who is moving fast.

Figure 10:
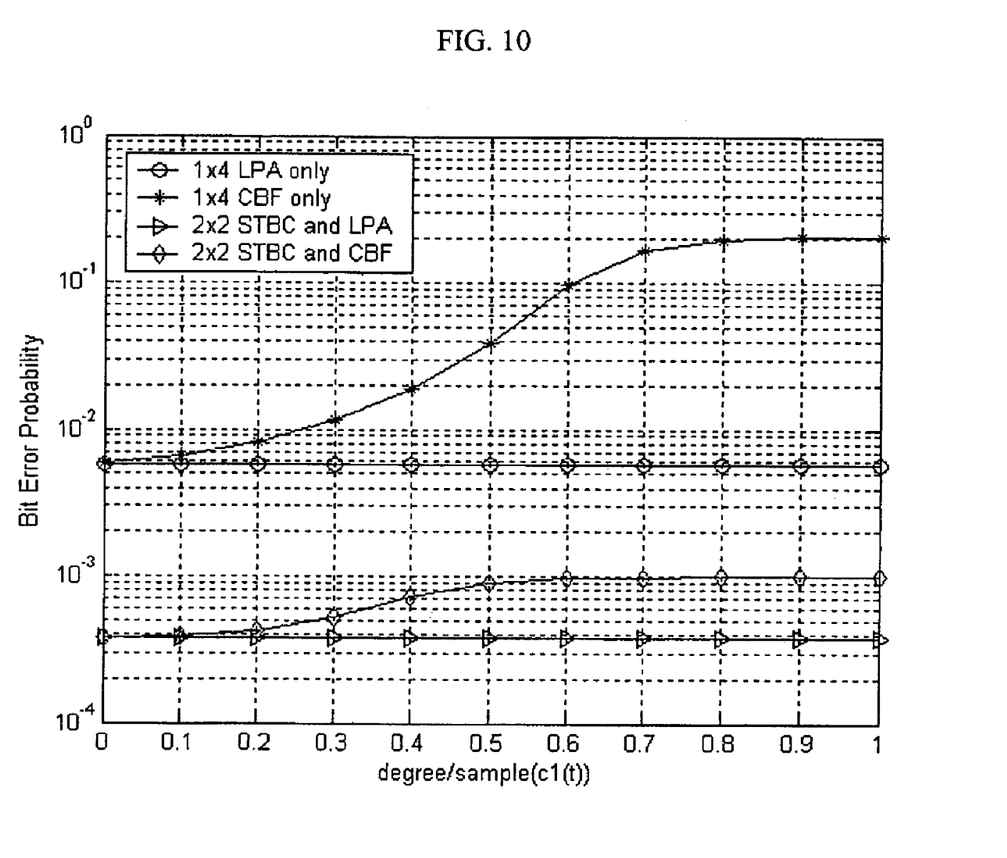
FIG. 10 is a graph comparatively depicting bit-error rates of a CBF/LBF-based STBC system and a beam-forming system without an STBC scheme.

FIG. 10 is a graph comparatively depicting bit-error rates of a CBF/LBF-based STBC system and a beam-forming system without an STBC scheme.

From the compared result shown in FIG. 10, it can be seen that the CBF/LPA-based STBC system has a lower bit-error rate than the beam-forming system without the STBC mode. Especially, in the variation of bit-error rates according to velocities, the LPA mode is constant but the CBF mode is higher with an increase in velocity.

However, as shown in the cases of LPA and CBF, since it re-estimates a DOA for itself when a velocity of a sample is close to 1, the bit-error rate becomes constant as the sample velocity tends towards 1.

According to the STBC transceiving system combined with the LPA-based beamformer, since pluralities of the transmission antennas are used at the side of a base station, transmission diversity becomes higher and a received signal gain increases to noise at a mobile user. Thus, there are effects of raising data restoration rates and reducing re-transmission times, thereby accomplishing high data transmission rates.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A space-time block coding (STBC) transceiving system combined with beamformer based on local polynomial approximation (LPA), comprising:
    an STBC encoder having branches in number of D to generate output signals in number of D for a single input signal;
    a beamformer having output antennas in number of D*B, which includes beam-forming subarrays in number of D each having the output antennas in number of B to form downlink beams from signals in number of D outputted from the STBC encoder; and
    an STBC decoder restoring an original signal by dividing a single signal, which is transmitted from the D-numbered beam-forming subarrays to a single mobile antenna, into signals in number of D in consideration of channel characteristics, wherein the beamformer comprises:
    a direction of arrival (DOA) and velocity estimator evaluating variables of DOA and velocity in a steering vector that has the minimum sum value of squares of differences between original signals transmitted to a base station from a mobile user, and estimated user signals combined with steering vectors variable by DOAs and mobile user velocities, for each sample within a modified window period regarding infinitely continuous mobile-user signals as definitely discrete samples in a period, and generating a downlink beam from the evaluated value of the DOA and velocity; and
    a steering-vector operation unit conducting a steering-vector operation by using signal wavelengths and DOAs to adjust delay components by distances (d) between the antennas with reference to positions of a first antenna to the B-numbered antennas.

2. The STBC transceiving system as set forth in claim 1, wherein the DOA and velocity estimator evaluates a variable matrix $C(c_0,c_1)$ at the minimum value of a function $$F(c, s(t), t) = \sum w(u) \sum_{k=1}^{B} |r_k(t+u) - \vec{a}(C, u)s(t+u)|^2,$$

where: $c_0$ is $\theta(t)$, that is a DOA at a point t to obtain a mobile user's DOA $\theta(t+u)$ with a delay by u; $c_1$ is $\theta'(t)$, that is a first differential value of the $\theta(t)$ as the variable of velocity, the function using a difference between the original signal r(t) and a restored signal $\bar{a}(C,u)s(t+u)$ for predetermined samples in the modified window period; w(u) is a modified window function to represent continuous signal samples in discrete form; $r_k(t+u)$ is the signal transmitted to the base station from the mobile user, and s( ) is a mobile user's signal estimated at the base station, and
    generates the downlink beam by using the components of the variable matrix as the DOA and the mobile user velocity.

3. The STBC transceiving system as set forth in claim 2, wherein the DOA and velocity estimator evaluates the variable matrix C at the maximum value of an LPA-based beamforming equation $$F(C, t) = \sum w(u) \sum_{k=1}^{B} |\vec{a}(C, u)r_k(t+u)|^2$$

that is derived by a first differential operation from the function for estimating the DOA and mobile user velocity, F(c,s(t),t), reducing a quantity of calculation in estimating the DOA and mobile user velocity, and
    generates the downlink beam by using the components of the variable matrix as the DOA and the mobile user velocity.

4. The STBC transceiving system as set forth in claim 1, wherein the steering vector for the B-numbered antennas used in the beam-forming subarray is given by $$\vec{a}(\theta) = \frac{1}{\sqrt{B}}\left(\exp j\frac{2\pi}{\lambda}d_1\sin\theta, \exp j\frac{2\pi}{\lambda}d_2\sin\theta, \ldots, \exp j\frac{2\pi}{\lambda}d_B\sin\theta\right)$$

where d is the distance between the antennas with reference to the positions of the first antenna to the B-numbered antennas, and $\lambda$ is wavelength of the signal received at each of the B-numbered antennas.

5. The STBC transceiving system as set forth in claim 1, wherein the STBC decoder comprises:
    a channel estimator configured to estimate the channel characteristics among the beam-forming subarrays and a mobile reception antenna;
    a combiner configured to combine the channel characteristics with a single signal accepted by the mobile reception antenna and to divide the combined signal into signals in number of D; and
    a detector configured to restore the original signal from the divided signals in number of D considering the estimated channel characteristics and the steering vector of the antenna.

* * * * *

UNITED STATES PATENT AND TRADEMARK OFFICE
CERTIFICATE OF CORRECTION

PATENT NO. : 7,555,050 B2
APPLICATION NO. : 11/397133
DATED : June 30, 2009
INVENTOR(S) : Dong-Soo Har and Sun-Hee Hwang It is certified that error appears in the above-identified patent and that said Letters Patent is hereby corrected as shown below:

Column 12, Line 1, replace "$\bar{a}(C,u)s(t+u)$" with --  --.

Signed and Sealed this

Fifteenth Day of September, 2009

David J. Kappos
*Director of the United States Patent and Trademark Office*